Feb. 23, 1960 D. L. MacDAVID 2,925,985
ELECTRICALLY ACTUATED, PILOT OPERATED VALVE
Filed Aug. 10, 1956

DANIEL L. MacDAVID
INVENTOR.

BY Herbert E. Kidder
AGENT

United States Patent Office 2,925,985
Patented Feb. 23, 1960

2,925,985

ELECTRICALLY ACTUATED, PILOT OPERATED VALVE

Daniel L. MacDavid, Arlington, Calif., assignor to Irving Dumm, III, Long Beach, Calif.

Application August 10, 1956, Serial No. 603,249

6 Claims. (Cl. 251—30)

The present invention relates to valves, and its primary object is to provide a new and improved electrically actuated, pilot operated valve that is extremely compact and light weight, and which is particularly adapted to miniaturization for aircraft and missile use, or wherever a small, light weight valve is required to handle high pressure gases or fluids.

Another object of the invention is to provide a valve of the type described which is relatively simple and inexpensive to manufacture, yet at the same time reliable, trouble free, and unfailing in operation.

A further object is to provide a pilot operated valve wherein the piston travel is entirely independent of pilot travel, thereby enabling the piston to move a considerable distance with only a slight movement of the pilot.

Still another object of the invention is to provide an electrically actuated valve employing a unique electromagnetic system which provides an extremely strong initial pull on the pilot because of the large area and particular shape of the armature and tapered pole ring. Sufficient magnetic force is developed by this unique system to lift the armature pilot disc directly, without resorting to devices giving mechanical advantage.

One important feature of the novel electromagnetic system of my invention is that when used with alternating current, the inductive reactance is substantially constant regardless of the position of the moving parts, and therefore the coil cannot be subjected to overcurrent if the valve should fail to operate due to pressures beyond the ability of the magnetic circuit to lift the armature off its seat.

Another important feature of the valve and its electromagnetic system is that because of its unique operating principle, the piston and armature may be made with very little mass, since neither depends in any way on the inertia of impact to aid them in operation. As a result, the valve may be operated at extremely low pressure in any position and under conditions of severe acceleration without malfunctioning.

The foregoing and other objects and advantages of the present invention will become apparent to those skilled in the art upon consideration of the following detailed description of the preferred embodiment thereof, reference being had to the accompanying drawings, wherein.

Figure 1:
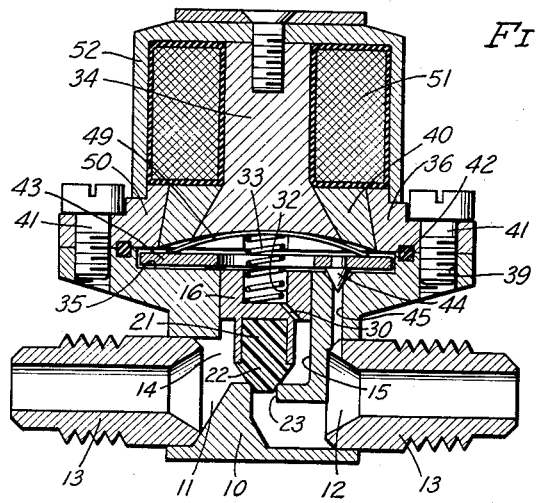
Figure 1 is a sectional view thru a valve embodying the principles of the invention, showing the valve in the closed condition.
Figure 2:
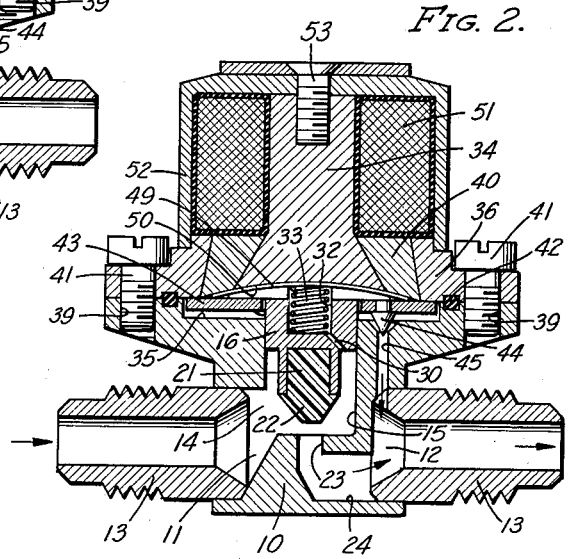
Figure 2 is a similar view of the same, showing the valve in the open condition.
Figure 3:
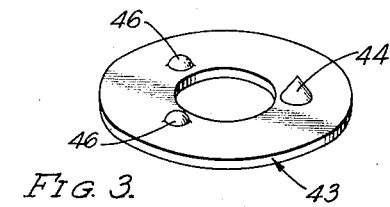
Figure 3 is a perspective view of the armature ring inverted, showing the conical valve plug and the two hemispherical pivots.

Referring first to Figures 1 to 3, I show a 2-way valve comprising a body 10 of circular horizontal cross section, having oppositely disposed inlet and outlet ports 11 and 12, respectively, into which threaded pipe fittings 13 are brazed. The inlet port 11 opens at 14 into a vertical bore 15 and slidably disposed within the bore is a piston 16. The lower half of the piston is reduced somewhat in diameter, and is preferably bored out centrally from the bottom end to receive an insert 21 of Teflon or other suitable plastic material. The insert 21 has a downwardly projecting tapered nose 22, which seats on the marginal edges of an orifice 23 extending down thru the bottom of the bore 15 to a horizontal passageway 24, which opens into the outlet port 12.

A small diameter passageway 30 is drilled upwardly at an angle thru the piston 16 from the reduced diameter portion thereof, and opens into the bottom of a cylindrical cavity 32 formed in the top end of the piston. The bottom end of a spring 33 is seated in the cavity, and the top end thereof is seated in a similar cavity in a pole piece 34. The spring 33 holds the piston lightly down against its seat when there is little or no pressure on the inlet side of the valve. The passageway 30 transmits fluid pressure from the inlet port 11 to the space above the piston 16, and the pressure of the fluid acting downwardly against the entire top surface of the piston holds the piston tightly against its seat.

The upper portion of the body 10 is enlarged diametrically, and a shallow counterbore 35 is provided in the top surface thereof concentric with the bore 15. The top end of the body 10 is capped by a bonnet assembly comprising a bonnet flange 36, tapered pole ring 40, and pole piece 34, said bonnet flange being secured to the body by a plurality of screws 41, which are threaded into tapped holes 39 in the body. An O-ring 42 seated within opposed annular grooves in the valve body 10 and bonet flange 36 seals the joint against leakage.

Disposed within the shallow counterbore 35 is a pilot, or armature 43, which is in the form of a thin disc, or washer-like ring of magnetic material, such as 430F stainless steel. The inside diameter of the hole in the center of the armature ring 43 is somewhat larger than the outside diameter of the piston 16, so that the latter can pass freely thru the armature ring. Fixed to the ring 43 and projecting downwardly therefrom is a conical valve plug 44 of Teflon or the like, which seats in a correspondingly shaped seat in the top end of a vertical drilled hole 45. At its bottom end, the drilled hole 45 opens into the outlet port 12. The valve plug 44 serves the function of a pilot valve, and is referred to as such in the claims.

On the side of the armature ring 43 opposite the valve plug 44 are two spaced, hemispherical pivots 46 (Figure 3) which seat in spherically curved depressions (not shown) in the bottom of the counterbore 35. The pivots 46 serve to locate and level the armature ring 43 so that the valve plug 44 is correctly positioned with respect to its seat. The armature ring 43 is lightly held down against the valve body by a bowed spring leaf 49, and an arcuate slot 50 is cut diametrically across the bottom of the tapered pole ring 40 and pole piece 34 to provide a pocket for the spring.

The tapered pole ring 40 has upwardly converging conical side walls; the inner wall being inclined at more of an angle than the outer wall, and the included angle between the inner and outer walls being preferably of the order of 20°. The pole ring 40 is of nonmagnetic material, preferably nonmagnetic stainless steel, as is the body 10; while the pole piece 34, bonnet flange 36, coil cap 52, armature ring 43, and piston 16 are of magnetic stainless steel, or its equivalent. The pole ring 40 is ideally located with respect to the armature ring 43 so that the area of the armature ring covered by the bonnet flange 36 is substantially equal to the area covered by the pole piece 34.

The pole piece 34 projects above the top of the pole ring 40 and bonnet flange 36, and encircling the projecting portion is an electromagnet coil 51. A cup-shaped coil cap 52 encloses the coil 51, and is secured to the pole piece 34 by a screw 53.

The combination of a coil with a tapered pole ring, and a generally flat, disc-like armature spaced a short distance from the pole ring is believed to be unique in electromagnetic systems. The tapered pole ring acts to concentrate and focus the magnetic flux on a relatively thin armature of large area, so that the maximum magnetic pull is applied to the armature. This is due to the fact that the nonmagnetic pole ring 40 serves, in effect, as a magnetic air gap, and because of the taper in the pole ring cross section, this gap is substantially shorter across the bottom than across the top; hence the magnetic field is of greatest intensity immediately adjacent the armature ring. This eliminates the need for any switches, relays, or devices such as double coils or doubly wound coils in order to provide sufficient magnetic force for high pressure operation of the pilot, as would be the case with conventional electromagnets. Another important feature is that the electric coil is completely removed from the area of pressure fluid, which is advantageous from the standpoint of dissipating coil heat, particularly when working with hot fluids.

To operate the valve, the armature ring need be lifted only a small fraction of an inch in order to unseat the valve plug 44 and open the passageway 45; hence, the armature ring can be located very close to the bottom surface of the pole ring 43, where the magnetic flux density is extremely high.

The operation of the valve is as follows: With the valve closed, as in Figure 1, application of fluid pressure to the inlet side causes pressure to be transmitted thru the passageway 30 to the space above the piston 16. The outlet passageway 45 is closed by the valve plug 44, and therefore the pressure applied to the top surface of the piston is the same as the pressure in the inlet port 11. The area on the top of the piston exposed to fluid pressure exceeds the area on the bottom by an amount equal to the cross sectional area of the orifice 23, and the net result is a downward thrust of fairly large magnitude. Thus, the piston is held down on its seat primarily by fluid pressure; the spring 33 contributing only a negligible thrust to the total downward pressure.

When the coil 51 is energized, a powerful magnetic attraction is exercised on the armature ring 43, lifting the valve plug 44 out of its seat, as shown in Figure 2, thereby allowing fluid pressure to escape thru the passageway 45. The passageway 45 is larger in area than passageway 30 and therefore fluid escapes from the space above the piston faster than it can enter. As a result, pressure in the space above the piston drops almost instantaneously to the level of the outlet pressure. At this point, the net force on the piston is in the upward direction, an is sufficient in magnitude to lift the piston off its seat by fluid pressure. As the piston moves upwardly in the bore 16, it is attracted by the magnetic field and drawn thru the hole in the center of the armature ring against the bottom face of the pole piece 34, where it is magnetically held as long as there is current passing thru the coil 51. This position of the piston is independent of fluid flow thru the valve or pressure drop across the orifice 23, and as a result, the valve may be made to have no flow regulating characteristics over all conditions of flow or pressure.

If, for some reason, a pressure regulating action is preferred, and the position of the main piston is to be a function of the fluid flow thru the valve, or pressure drop across the valve orifice, the piston 16 may be made of nonmagnetic material, in which case it will not be attracted to or held by the magnetic pole. The piston would then remain in the up position because of the pressure drop across the main valve orifice 23, which results in a lower pressure at the outlet aperture 12 than at the inlet 11. Since the space above the piston is connected by the passageway 45 to the outlet side, its pressure is less than that of the inlet side, and as long as there is a flow of fluid thru the main valve orifice, the piston will remain in the up position.

As will be evident from the foregoing, the position of the new armature ring 43 that closes the pilot-opening passageway 45 is determined by whether the electric coil 51 is energized. Its position is independent of the pressure applied to the valve and its travel is entirely independent of the travel of the piston. Only when the coil 51 is de-energized does the spring 49 return the armature ring to its normal position, so the conical plug 44 is seated in the passageway 45.

In addition to the flux focusing and concentrating function of the tapered pole ring, there is another important advantage from the assembly standpoint, inasmuch as the parts tend to wedge more tightly together when pressure is applied from the inside. Thus, the bonnet flange 36, pole ring 40, and pole piece 34 are joined together as a fluid tight assembly, limited in strength only by the shear strength of the materials.

Because of the extremely small movement by the armature ring 43 when the coil is energized, the inductive reactance of the circuit is substantially constant regardless of the position of the moving parts, when the valve is used with alternating current. As a result, the coil cannot be subjected to overcurrent if the valve should fail to operate because of pressures beyond the ability of the magnetic circuit to lift the armature pilot off its seat. This is not the case in conventional magnetic pilot valves, where the inductive reactance of the device is greatly affected by the considerable distances travelled by the moving parts.

One other feature of the present invention that should be mentioned at this point is that because neither the armature nor the piston depends in any way upon the inertia of impact to aid them in opening the valve, these moving parts may be made with very little mass. As a result, the valve may be operated at extremely low pressure in any position and under conditions of severe acceleration without malfunctioning.

Figure 4:
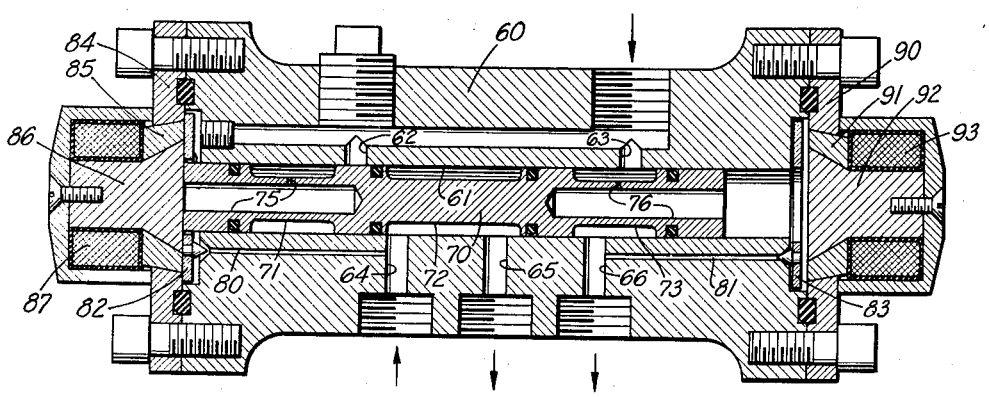
Figure 4 is a sectional view thru another embodiment, showing the principles of the invention applied to a 4-way valve.

Another embodiment of the invetion is illustrated in Figure 4, wherein I show the principle of the invention applied to a 4-way valve. In this embodiment, the valve body 60 is provided with a longitudinally extending bore 61, which is intersected by inlet ports 62, 63, and outlet ports 64, 65, and 66. A piston, or spool 70, is slidably disposed within the bore 61. Annular grooves 71, 72, and 73 in the spool provide shiftable passageways, whereby the inlet port 63 can be connected to the outlet port 66; and, simultaneously outlet port 64 is connected to outlet port 65, or alternatively, inlet port 62 can be connected to outlet port 64, and simultaneously outlet port 66 is connected to outlet port 65. Passageways 75 and 76 in the spool transmit fluid pressure from the inlet ports to the left and right hand ends, respectively, of the spool.

Passageways 80 and 81 in the body communicate between the left hand end of the bore and outlet port 64, and between the right hand end of the bore and outlet port 66. A conical valve plug on an armature ring 82 closes passageway 80, while a similar plug on an armature ring 83 closes passageway 81. Mounted on the left hand end of the body is an assembly comprising a bonnet flange 84, tapered pole ring 85, pole piece 86, and coil 87, all as described in more detail in connection with Figure 1 to 3. A similar assembly consisting of bonnet flange 90, tapered pole ring 91, pole piece 92, and coil 93 is mounted on the right hand end of the body.

The operation of this form of valve is believed to be more or less self-evident, in view of the earlier description of Figure 1 to 3. When the spool is in the position shown in Figure 4 with the left hand coil 87 energized, pressure from the inlet port 63 is transmitted thru passageway 76 to the right hand end of the spool. Passageway 81 is closed by the valve plug on armature ring 83, and pressure on the right hand end of the spool is therefore equal to the inlet pressure. This pressure forces the spool to the left, as shown in the drawing, connecting inlet 63 with outlet 66, and also connecting outlet 64 with outlet 65.

To shift the spool 70 to the right, coil 93 is energized, and coil 87 is simultaneously de-energized. This causes the right hand armature 83 to be pulled against the tapered pole ring, thereby opening passageway 81, while at the same time armature ring 82 is released and closes passageway 80. Pressure in the right hand end of the bore now drops off to below inlet pressure, causing the spool to move to the right. As inlet 62 is uncovered by groove 71, pressure from inlet 62 is transmitted to the left hand end of the spool, thereby assisting the spool in its movement to the right, and then holding the spool at the right hand end of the bore by fluid pressure. In this condition, inlet 62 is connected to outlet 64, while outlet 66 is connected to outlet 65.

While I have shown and described two embodiments of the invention in considerable detail, it is to be understood that various changes may be made without departing from the broad scope of the invention, as defined in the appended claims.

I claim:

1. A fluid valve having a body provided with inlet and outlet ports interconnected by an orifice, a bore concentric with said orifice, a piston of magnetic material slidably disposed within said bore and having a nose portion seating on said orifice to close the same, there being an enclosed space above said piston, a passageway communicating between said inlet port and said space, whereby fluid pressure in said inlet port is transmitted to the top side of said piston, and a second passageway communicating between said space and said outlet port, said second passageway being less restricted to flow of fluid than said first-named passageway, means for actuating said piston comprising in combination, a thin, generally flat armature ring of magnetic material disposed within said space concentric with said piston, the center hole in said armature ring being larger in diameter than said piston to receive the end of said piston in its valve opening movement, said armature ring having a projection on the bottom side thereof engageable with a seat in said second passageway to close the latter, a bonnet assembly fixed to said body and enclosing said space above said piston, said bonnet assembly comprising a bonnet flange having an internal tapered wall, tapered pole ring, and center pole piece having a tapered outer wall, said tapered pole ring being formed of nonmagnetic material and having downwardly converging side walls which are sloped so as to engage the tapered walls of the pole piece and bonnet flange so that internal pressure causes said bonnet flange, tapered pole ring, and center pole piece to wedge tightly together, a coil surrounding said pole piece, and a coil cap enclosing said coil, said bonnet flange, center pole piece, and coil cap being of magnetic material to form a magnetic path for the flux lines of the coil when the latter is energized, said tapered pole ring serving as a magnetic gap in said path, said armature ring spanning said pole ring and the width of said gap being narrower adjacent said armature ring than it is adjacent said coil, whereby the flux density is increased in the immediate area of said armature ring.

2. In a fluid valve having a body provided with inlet and outlet ports interconnected by an orifice, a bore concentric with said orifice, a piston of magnetic material vertically slidably disposed within said bore and having a nose portion at its lower end seating on said orifice to close the same, there being an enclosed space above said piston, a passageway communicating between said inlet port and said enclosed space, whereby fluid pressure in said inlet port is transmitted to the top side of said piston, and a second passageway communicating between said space and said outlet port, said second passageway being less restrictive to flow of fluid than said first-named passageway and being formed with a seat at its upper end, means for actuating said piston comprising: a thin, generally flat armature ring of magnetic material disposed within said enclosed space concentric with said piston, the center hole in said armature ring being larger in diameter than said piston, said armature ring having a projection on the bottom side thereof engageable with said seat in said second passageway to close the latter; an electromagnetic coil disposed above said armature ring and concentric therewith, said coil being operable to magnetically attract said armature ring to unseat said projection thereby opening said second passageway and causing the pressure above piston to drop below the inlet pressure, the pressure in said inlet port acting on said piston to lift the latter off its seat on said orifice, with said piston moving upwardly through the center hole of said armature ring so as to be held in its upper position by the magnetic flux of said coil.

3. In a fluid valve having a body provided with inlet and outlet ports interconnected by an orifice, a bore concentric with said orifice, a piston vertically slidably disposed within said bore and having a nose portion at its lower end seating on said orifice to close the same, there being an enclosed space above said piston, a passageway communicating between said inlet port and said enclosed space, whereby fluid pressure in said inlet port is transmitted to the top side of said piston, and a second passageway communicating between said space and said outlet port, said second passageway being less restrictive to flow of fluid than said first-named passageway and being formed with a seat at its upper end, means for actuating said piston comprising: a thin, generally flat armature ring of magnetic material disposed within said enclosed space concentric with said piston, the center hole in said armature ring being larger in diameter than said piston, said armature ring having a projection on the bottom side thereof engageable with said seat in said second passageway to close the latter; a pole piece formed in said body above said piston; an electromagnetic coil encircling said pole piece and disposed above said armature ring and concentric with the latter, said coil being operable to magnetically attract said armature ring to unseat said projection thereby opening said second passageway and causing the pressure above piston to drop below the inlet pressure, the pressure in said inlet port acting on said piston to lift the latter off its seat on said orifice, with said piston moving upwardly through the center hole of said armature ring; and spring means interposed between said pole piece and said piston constantly biasing said piston downwardly towards a seated position on said orifice.

4. In a fluid valve having a body provided with inlet and outlet ports interconnected by an orifice, a bore concentric with said orifice, a counterbore coaxial with said bore and intersecting the upper portion of said bore, a piston of magnetic material slidably disposed within said bore and having a nose portion seating on said orifice to close the same, there being an enclosed space above said piston at least partially defined by said counterbore, a passageway communicating between said inlet port and said enclosed space whereby fluid pressure in said inlet port is transmitted to the top side of said piston, and a second passageway communicating between said enclosed space and said outlet port, said second passageway being less restrictive to flow of fluid, than said first-named passageway and being formed with a seat at its upper end, means for actuating said piston comprising: a thin, generally flat armature ring of magnetic material disposed in said space within the confines of said counterbore, the center hole of said ring being larger in diameter than said piston, said ring having a valve plug projecting downwardly from one side thereof engageable with said seat formed at the upper end of said second passageway to close the latter, the opposite side of said armature member being formed with depending pivot means that rest upon the upwardly-facing surface of said counterbore; and an electromagnetic coil disposed above said armature member and concentric therewith, said coil being operable to magnetically attract said armature ring so as to unseat said valve plug upwardly to thereby open said second passageway and cause the pressure above said piston to drop below the inlet pressure, the pressure in said inlet port acting upon said piston to lift the latter off its seat, said piston moving upwardly through the center hole of said armature ring so as to be held in its upper position by the magnetic flux of said coil.

5. In a fluid valve having a body provided with inlet and outlet ports interconnected by an orifice, a bore concentric with said orifice, a counterbore coaxial with said bore and intersecting the upper portion of said bore, a piston slidably disposed within said bore and having a nose portion seating on said orifice to close the same, there being an enclosed space above said piston at least partially defined by said counterbore, a passageway communicating between said inlet port and said enclosed space whereby fluid pressure in said inlet port is transmitted to the top side of said piston, and a second passageway communicating between said enclosed space and said outlet port, said second pasageway being less restrictive to flow of fluid, than said first-named passageway and being formed with a seat at its upper end, means for actuating said piston comprising: a thin, generally flat armature ring of magnetic material disposed in said space within the confines of said counterbore, the center hole of said ring being larger in diameter than said piston, said ring having a valve plug projecting downwardly from one side thereof engageable with said seat formed at the upper end of said second passageway to close the latter, the opposite side of said armature member being formed with depending pivot means that rest upon the upwardly-facing surface of said counterbore; a pole piece formed in said body above said piston; and an electromagnetic coil encircling said pole piece and disposed above said armature member and concentric with the latter, said coil being operable to magnetically attract said armature ring so as to unseat said valve plug upwardly to hereby open said second passageway and cause the pressure above said piston to drop below the inlet pressure, the pressure in said inlet port acting upon said piston to lift the latter off its seat, said piston moving upwardly through the center hole of said armature ring; and spring means interposed between said pole piece and said piston constantly biasing said piston downwardly towards a seated position on said orifice.

6. In a fluid valve having a body provided with inlet and outlet ports interconnected by an orifice, a bore concentric with said orifice, a piston vertically slidably disposed within said bore and having a nose portion at its lower end seating on said orifice to close the same, there being an enclosed space above said piston, a passageway communicating between said inlet port and said enclosed space, whereby fluid pressure in said inlet port is transmitted to the top side of said piston, and a second pasageway communicating between said space and said outlet port, said second passageway being less restrictive to flow of fluid than said first-named pasageway and being formed with a seat at its upper end, means for actuating said piston, comprising: a thin, generally flat armature member of magnetic material disposed within said enclosed space concentric with said piston, said armature member having a projection on the bottom side thereof engageable with said seat in said second passageway to close the latter, the opposite side of said armature member being formed with depending pivot means that rest upon said body within said enclosed space, a bonnet assembly fixed to said body and enclosing said space above said piston, said bonnet assembly including a bonnet flange having an internal tapered wall, tapered pole ring, and center pole piece having a tapered outer wall, said tapered pole ring being formed of nonmagnetic material and having downwardly converging side walls which are sloped so as to engage the tapered walls of the pole piece and bonnet flange so that internal pressure causes said bonnet flange, tapered pole ring, and center pole piece to wedge tightly together; and a coil surrounding said pole piece, and a coil cap enclosing said coil, said bonnet flange, center pole piece, and coil cap being of magnetic material to form a magnetic path for the flux lines of the coil when the latter is energized, said tapered pole ring serving as a magnetic gap in said path, said armature member spanning said pole ring, and the width of said gap being narrower adjacent said armature member than it is adjacent said coil, whereby the flux density is increased in the immediate area of said armature member.

References Cited in the file of this patent

UNITED STATES PATENTS

| | | |
|---|---|---|
| 1,664,616 | French | Apr. 3, 1928 |
| 1,961,599 | Schwitzer | June 5, 1934 |
| 2,321,853 | Ray | June 15, 1943 |
| 2,339,352 | Ray | Jan. 18, 1944 |